United States Patent [19]
Coffinberry

[11] Patent Number: 5,343,691
[45] Date of Patent: Sep. 6, 1994

[54] REDUCING THERMAL DEPOSITS IN PROPULSION SYSTEMS

[75] Inventor: George A. Coffinberry, West Chester, Ohio

[73] Assignee: General Electric Company, Cincinnati, Ohio

[21] Appl. No.: 96,391

[22] Filed: Jul. 26, 1993

Related U.S. Application Data

[62] Division of Ser. No. 919,459, Jul. 27, 1992, Pat. No. 5,247,792.

[51] Int. Cl.⁵ .............................................. F02C 7/224
[52] U.S. Cl. ..................................................... 60/39.06
[58] Field of Search .............. 60/736, 737, 738, 39.02, 60/39.06

[56] References Cited

U.S. PATENT DOCUMENTS 3,667,221  6/1972  Taylor ................................... 60/737
3,691,762  9/1972  Ryberg et al. ......................... 60/737
3,940,923  3/1976  Pfefferle ............................. 60/39.06
4,084,371  4/1978  Howald ................................. 60/737
4,408,461  10/1983  Brühwiler et al. ..................... 60/737
4,429,527  2/1984  Teets ..................................... 60/736
4,561,257  12/1985  Kwan et al. ........................... 60/737

Primary Examiner—Richard A. Bertsch
Assistant Examiner—William J. Wicker
Attorney, Agent, or Firm—Jerome C. Squillaro; Nathan D. Herkamp

[57] ABSTRACT

This invention provides a method to mix a relatively large amount of non-condensable gas with fuel prior to gasification heating thus reducing the residence time of the fuel adjacent to hot surfaces. The non-condensable gas may be air, a cryogenic such as methane, or a chemical fraction of the gasified fuel which by itself does not promote the formation of significant amounts of gums or coke deposits.

3 Claims, 2 Drawing Sheets

REDUCING THERMAL DEPOSITS IN PROPULSION SYSTEMS

This is a division of application Ser. No. 07/919,459, filed on Jul. 27, 1992, now U.S. Pat. No. 5,247,792 issued Sep. 28, 1993.

BACKGROUND OF THE INVENTION

1. Field of the Invention

This invention relates to heat exchange systems such as may be used in propulsion systems with particular application to gas turbine engine combustors and more particularly to apparatus and methods for avoiding thermally induced fuel deposits on surfaces of a gas turbine engine combustion system heat exchanger.

2. Description of Related Art

It is well known to design aircraft propulsion systems to use gasified fuel. One purpose is to reduce production of oxides of nitrogen, $NO_x$, during the combustion process, a very serious design consideration. U.S. Pat. No. 3,890,088, entitled "Apparatus for Reducing Formation of Oxides of Nitrogen in Combustion Processes", by Antonio Ferri, is typical of the many ideas for reducing $NO_x$ production by first gasifying the liquid fuel in a heat exchanger. The Ferri patent discloses the gasification of liquid fuel in a heat exchange apparatus and its subsequent mixing with air prior to combustion.

It is well known that gaseous fuel can be more readily mixed with air than liquid atomized fuel, thus reducing the problem of localized stoichiometric temperatures and $NO_x$ production. It is also known to mix gaseous fuel and oxidants, such as air, in order to further reduce $NO_x$ production which in turn leads to shorter combustor lengths.

The problem encountered with such a method and apparatus is the formation of fuel deposits on the surfaces of the heat exchange apparatus due to chemical reactions. The process creates gum and coke products in the form of deposits on the hot heat exchanger surfaces which are contacted by the fuel. The problem for aircraft fuel is particularly acute in the mid-temperature range temperatures from about 550° to 900° F. (heat exchanger surface temperature) which generates gum (primarily polymeric) products which adhere and grow from the surface. Gums embed coke and other solids as they grow into a thick surface deposit.

There are a multitude of mechanisms and chemical reactions associated with the formation of gum and coke deposits. NASA Technical Memorandum 83420 entitled "Research on Aviation Fuel Instability" by Charles E. Baker, David A. Bittker, Stephen M. Cohen and Gary T. Seng, prepared for the AGARD Propulsion and Energetics Panel Symposium on Combustion Problems in Turbine Engines, Cesme, Turkey, Oct. 3–7, 1983 provides an explanation of these phenomena in so far as rocket and gas turbine engine designers are concerned. The authors note that fuel flow rate and residence time as an important factor influencing the rate and amount of deposit which might form under any circumstances. Residence time is the foremost issue addressed by the present invention. All chemical reactions require retention of the reactants in close proximity and time to complete the reaction or series of reactions. The formation of gum and coke deposits involve an enormous number of sequential reaction steps. Therefore, if the deposit forming reactant and intermediates remain in close proximity to the hot surface which provides the thermal energy needed to promote the chemical reaction, the residence time is said to be long and the deposits will be large. However, quickly removing the reactants and intermediates from the hot surface results in a net residence time too short to complete the deposit chemical process. The potentially troublesome reactant and intermediates simple pass over and away from the hot surface with no detrimental effect.

Gasification of liquid hydrocarbon fuel has application to many combustion systems such as marine and industrial gas turbines, scramjet, ramjets, rockets and other combustion engines. The gumming and coking problem is endemic to all of these applications and the present invention may be used for all these types of applications.

SUMMARY OF THE INVENTION

The present invention, an apparatus and method to avoid thermal fuel deposits, provides a means to mix a relatively large amount of non-condensable gas with the fuel prior to gasification heating. The non-condensable gas may be air, a cryogenic such as methane, or a chemical fraction of the gasified fuel with the stipulation that the non-condensable gas is essentially inert relative to its formation of gum and coke deposits. The non-condensable gas is one that does not by itself promote the formation of significant amounts of gums or coke deposits.

One embodiment provides a means to heat liquid Jet-A fuel above its critical temperature (i.e. that temperature above which a substance can exist only as a gas) of about 800° F. so that gaseous fuel can be provided to a combustor. A more particular embodiment provides a heat exchanger formed in part by the combustor walls and turbine nozzle vanes which is cooled by the liquid fuel and which reduces the need for air film cooling and reduces associated boundary layer $NO_x$ production.

Yet another embodiment provides a first mixer for mixing liquid fuel with an air and gaseous fuel mixture in a volumetric air/liquid ratio that provides a fuel lean mixture that is well above the limit required to reduce the fuel's residence time below that of significant coking, which in one example is about 22.5 to one. A means is provided to then pass the mixture through the heat exchanger passages which is formed in part by the wall of the combustor and the turbine nozzle. A means is provided at the exit of the heat exchanger to flow a first part of the gaseous fuel/air mixture to the combustor nozzles and a second part to a second mixer that is also operable to receive air from the engine compressor. The second mixer mixes engine compressor air and the gaseous fuel/air mixture to form a lower temperature gas mixture which reduces the temperature of the compressor air constituent sufficiently so it can be compressed by a small turbo-compressor. This compressed air and gaseous fuel mixture is then ducted to the first mixer to be mixed with the liquid fuel as explained above.

ADVANTAGES

Among the advantages provided by the present invention is a means for gasifying fuel in a heat exchanger, for use in a combustion system and more particularly in a propulsion engine, that prevents thermal fuel deposits from forming on the heat exchanger surface via chemical reactions. This provides a cleaner operating and shorter combustor that is economical to construct and operate.

The present invention prevents gum and coke deposits from forming on hot surfaces of the heat exchanger that would decrease its effectiveness. The present invention enhances the use of and provides more durable and improved low $NO_x$ combustors by reducing the gum and coke deposits which foul fuel heat exchangers in the combustion system. The present invention is particularly useful for keeping heat exchangers clean in combustion systems designed for use with gasified fuels which are gasified in the mid-temperature range from about 550° to 900° F. (surface temperature) which generates gum (primarily polymeric) products which adhere and grow from the surface.

When the non-condensable gas is air and a chemical fraction of the gasified fuel being used, coking is reduced or eliminated because of the relatively short time any droplet or concentration of fuel remains in contact with the hot surface and therefore there is no permanent fuel-phase boundary layer adjacent to the hot surface. Instead, the non-condensable gas primarily occupies the surface boundary layer thereby preventing both thermal contact and chemical reactions. The air heats the fuel as it moves by diffusion and turbulence from the surface to the center of the passageway.

The present invention provides a more durable longer lasting gasified fuel combustion system which is ultimately less expensive to operate and more commercially feasible than similar combustor systems presently available.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
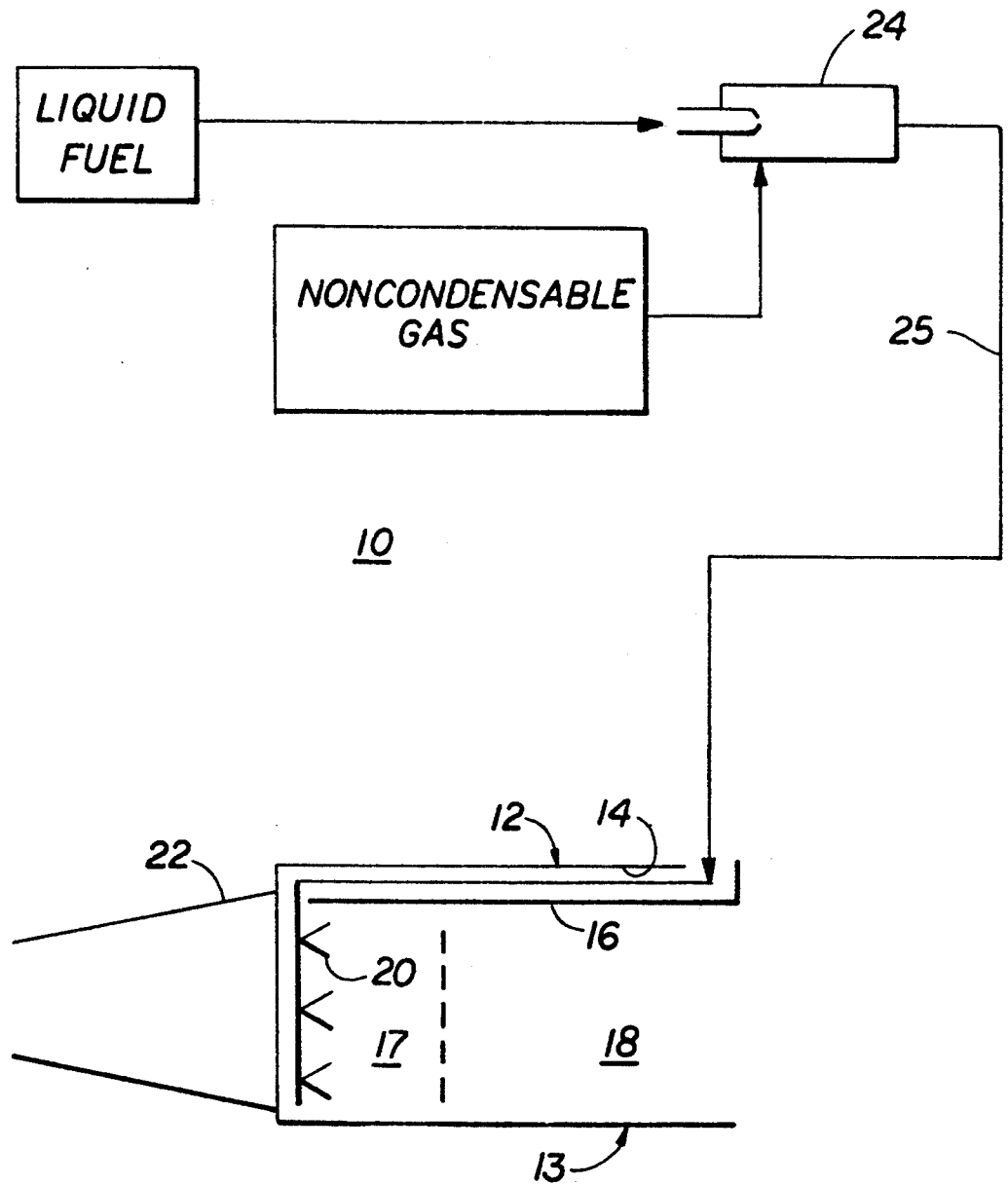
FIG. 1 is a schematic view of a combustor system in accordance with one embodiment of the present invention.

Schematically illustrated in FIG. 1 is a combustion system, generally shown at 10, for a propulsion engine such as for a rocket engine or an aircraft or marine or industrial gas turbine engine. The combustion system 10 has a heat exchanger 12 disposed in a combustion section of the engine generally indicated at 13. The heat exchanger 12 includes a fluid passage 14 constructed to conduct the fluid to be heated along a heat exchanger wall 16 that is designed to transfer heat from a hot source, which in this embodiment is a combustion zone 18 of the combustion section 13. The combustion section 13 also includes a plurality of nozzles 20 to provide fuel which is mixed with air or some other oxidant in a mixing zone 17 and combusted in the combustion zone 18. In the case of a gas turbine and some liquid oxidant rocket engines, air is taken from a compressor section of the engine, denoted by its compressor discharge duct 22. The combustion process burns the fuel and oxidant thereby producing very hot gases that are used for producing thrust.

The present invention provides a means and method to gasify fuel in the heat exchanger 12. A relatively large amount of non-condensable gas is mixed with the liquid fuel in a mixing means 24, to produce a mixture of liquid fuel and gas 25, prior to fuel gasification in heat exchanger 12 in order to avoid thermal fuel deposits and or coking in the heat exchanger. The heat exchanger 12 produces a gasified mixture of fuel and air that is then flowed through nozzles 20 and is combusted in the combustion zone 18 with low $NO_x$ production. The non-condensable gas may be air such as that available from the compressor section of the engine and more particularly from the compressor discharge duct 22, a cryogenic such as methane, or a chemical fraction of the gasified fuel.

Prevention of deposits may be enhanced by the use of coatings on the heat transfer surfaces such as those interior to the fluid passage 14 and particularly along the heat exchanger wall 16. An example of such a coating is the subject of U.S. patent application, Ser. No. 07/673,924, now abandoned, entitled "Fluid Containment Article for Hot Hydrocarbon Fluid and Method of Preventing Fuel Thermal Decomposition Deposits", by the present inventor.

Figure 2:
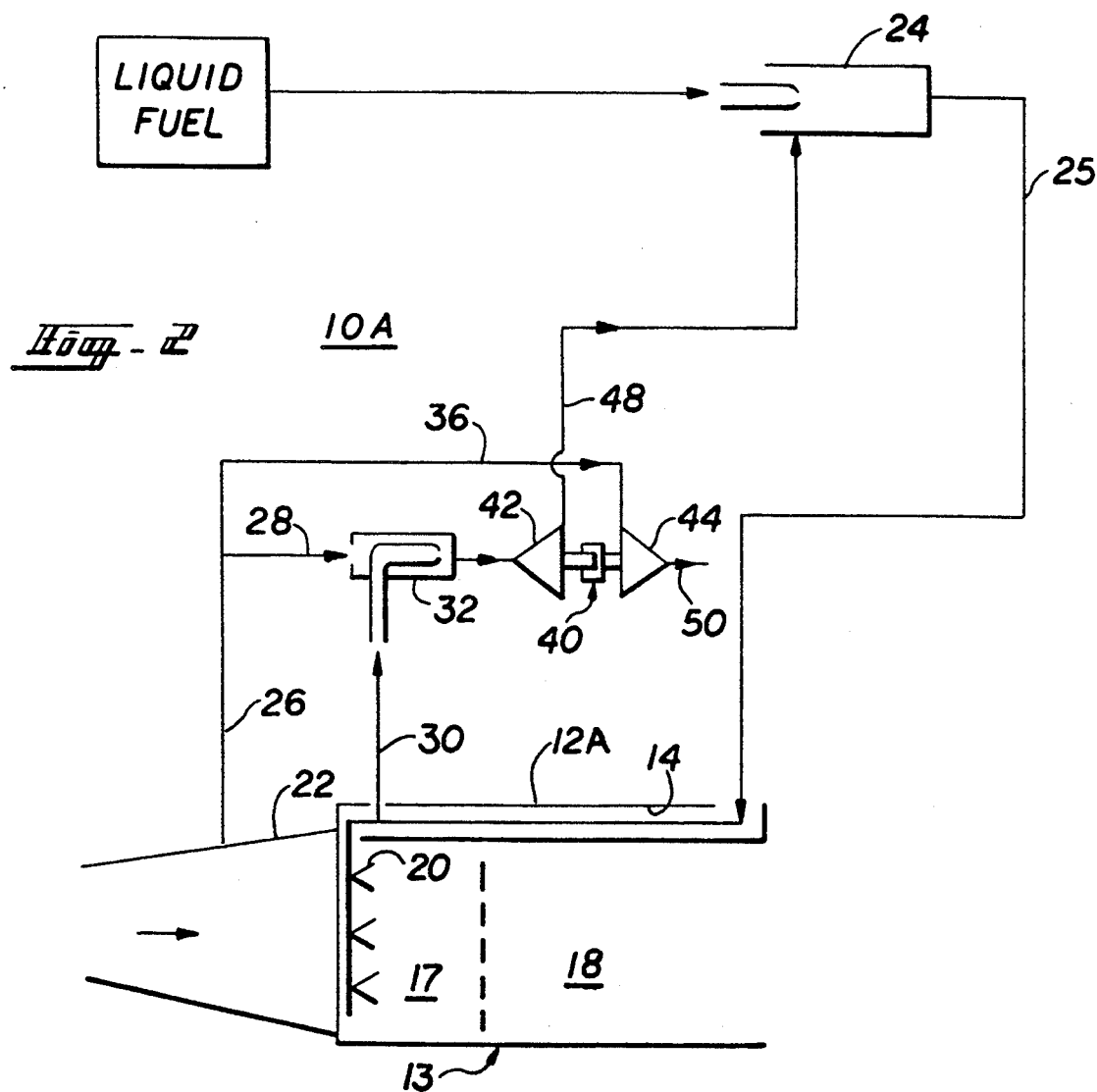
FIG. 2 is a schematic view of a combustor system of a gas turbine engine in accordance with a more particular embodiment of the present invention.

FIG. 2 schematically illustrates a more particular embodiment of the present invention having an alternate combustion system 10A as may be used in a gas turbine engine. The compressor discharge duct 22 is used as the source of non-condensable gas for mixing with the liquid fuel in the first mixing means 24 to produce the liquid fuel and air mixture 25. The air from the compressor discharge duct 22 is further pressurized to at least the pressure of the liquid fuel entering the first mixing means 24 by a turbo-compressor 40. The combustion system 10A is constructed to take compressor discharge air 26 from the compressor discharge duct 22 and pass a portion of it, indicated by a first line 28, to a compressor 42 driven by a turbine 44 of the turbo-compressor 40. Power to drive the turbine 44 is supplied by a second portion of the compressor discharge air 26, indicated by a second line 36 and which is then exhausted through a turbine outlet 50. The properly pressurized non-condensable gas 48 is then supplied to the first mixing means 24.

The compressor discharge air 26 is often too hot to be efficiently compressed to a higher pressure, therefore the embodiment illustrated in FIG. 2 provides an alternate heat exchanger 12A, similar to the heat exchanger 12 in FIG. 1, that includes a means to mix a portion 30 of the gasified mixture of fuel and air with a portion of the compressor discharge air 26 indicated by the first line 28 in a second mixing means 32. The gasified mixture of fuel and air, typically 800° F., is typically cooler than the compressor discharge air, typically 1200° F. or higher. The remainder of the gasified mixture of fuel and air from the fluid passage 14 is then flowed through the nozzles 20 for mixing in the mixing zone 17 and combustion in the combustion zone 18.

Figure 3:
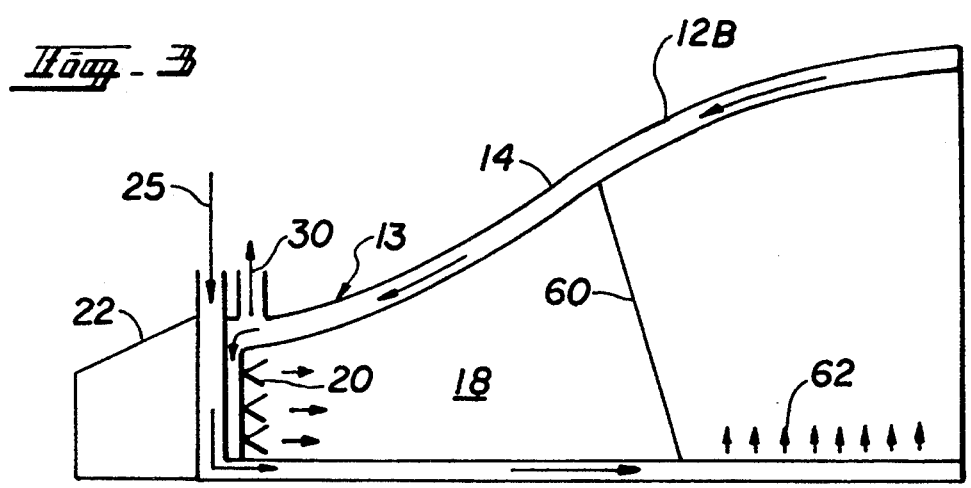
FIG. 3 is a is a schematic view of an alternate heat exchanger for the combustor system of the gas turbine engine illustrated in FIG. 2.

FIG. 3 illustrates another embodiment of the present invention which provides another alternative heat exchanger 12B disposed in a hot section of the engine which typically includes the combustion section and a turbine section of the engine. The hot section of the present invention is illustrated by the combustion zone 18 and a turbine nozzle vane 60 disposed directly downstream of the combustion zone. The liquid fuel is gasified by flowing the liquid fuel and air mixture 25 through a heat exchanger passage 62 of the turbine nozzle vane 60 as well as through the fluid passage 14 of heat exchanger 12B in the combustion section 13 of the engine. This helps cool the turbine nozzle vane thus saving on cooling air conventionally taken from the compressor section or fan section of the engine. The invention cools the combustor walls and turbine nozzle vanes cooled which can reduce or even eliminate the need for air film cooling and its associated boundary layer $NO_x$ production.

While the preferred embodiment of the present invention has been described fully in order to explain its principles, it is understood that various modifications or alterations may be made to the preferred embodiment without departing from the scope of the invention as set forth in the appended claims.

I claim:

1. A method for combusting fuel in a gas turbine engine comprising the following steps:

mixing a compressed gas with liquid fuel in a first mixing means to form a liquid and gas mixture prior to heating the liquid and gas mixture, flowing the liquid and gas mixture through a heat exchanger and gasifying all of the liquid fuel and gas thereby forming a fuel and air gaseous mixture, flowing a first portion of the fuel and air gaseous mixture to the gas turbine engine combustion section and combusting the fuel and air gaseous mixture, flowing a second portion of the fuel and air gaseous mixture to a second mixer, and mixing air compressed by the compressor section of the gas turbine engine with the second portion of the fuel and air gaseous mixture in the second mixer thereby forming a relatively cool air and fuel gaseous mixture and flowing the relatively cool air and fuel gaseous mixture to the first mixing means to serve as the compressed gas for mixing with the liquid fuel.

2. A method for combusting fuel as claimed in claim 1 further comprising an intermediate step of compressing the relatively cool air and fuel gaseous mixture before flowing it to the first mixing means to mix with the liquid fuel.

3. A method for combusting fuel as claimed in claim 2 comprising an intermediate step of compressing the relatively cool air and fuel gaseous mixture with a turbo-compressor driven by compressed air from the compressor section of the gas turbine engine before flowing it to the first mixing means to mix with the liquid fuel.

* * * * *